United States Patent
Clark

[11] 3,765,702
[45] Oct. 16, 1973

[54] SWAY BAR FOR VEHICLES
[76] Inventor: William J. Clark, Tulsa, Okla.
[22] Filed: Nov. 15, 1971
[21] Appl. No.: 198,572

[52] U.S. Cl. ............................. 280/446 B, 188/313
[51] Int. Cl. ............................................. B60d 1/14
[58] Field of Search .................. 188/313, 318, 269, 188/316; 280/446 B, 446 R, 432, 457

[56] References Cited
UNITED STATES PATENTS

| | | | |
|---|---|---|---|
| 1,794,981 | 3/1931 | Philpott | 188/269 |
| 2,323,352 | 7/1943 | Pitts | 188/313 |
| 2,692,146 | 10/1954 | Black | 280/432 |
| 2,699,956 | 1/1955 | Mattson | 280/457 |
| 2,709,088 | 5/1955 | Orbits | 280/432 |
| 2,726,097 | 12/1955 | Darrough | 280/446 B |
| 2,762,634 | 9/1956 | Moseley | 280/432 |
| 3,379,456 | 4/1968 | Bogie | 280/446 B |

*Primary Examiner*—Leo Friaglia
*Assistant Examiner*—Randall A. Schrecengost
*Attorney*—William S. Dorman

[57] ABSTRACT

A device secured between a towing vehicle and a towed vehicle for reducing sway of the towed vehicle during travel. A rod member connected with one of the vehicles and having a piston head at the outer end thereof disposed within a hydraulic cylinder connected with the other vehicle. The travel of the piston in the hydraulic cylinder is controlled or retarded for controlling relative swaying movement between the vehicles.

2 Claims, 6 Drawing Figures

Patented Oct. 16, 1973

INVENTOR.
William J. Clark

BY William S. Dorman

ATTORNEY

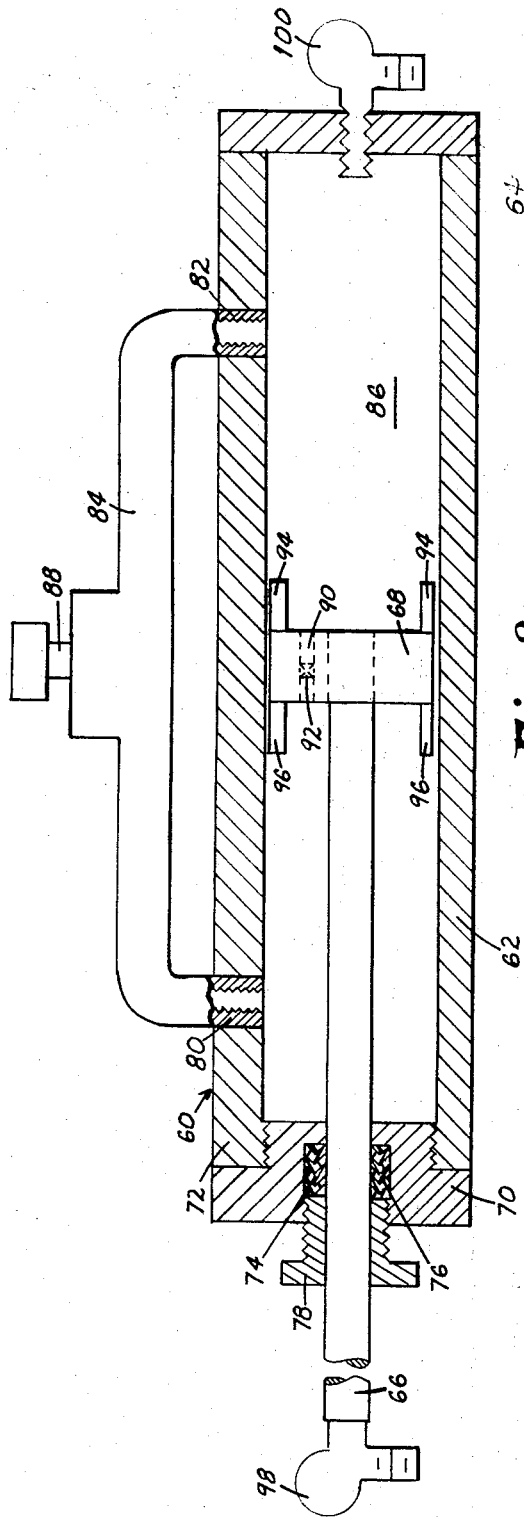
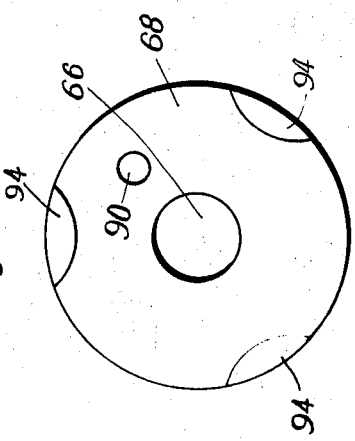

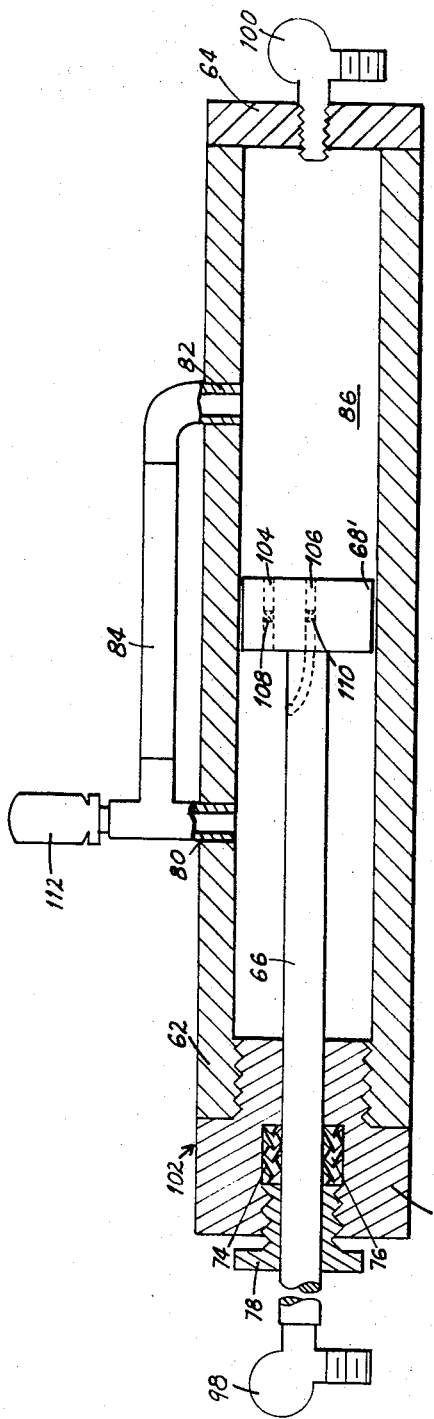
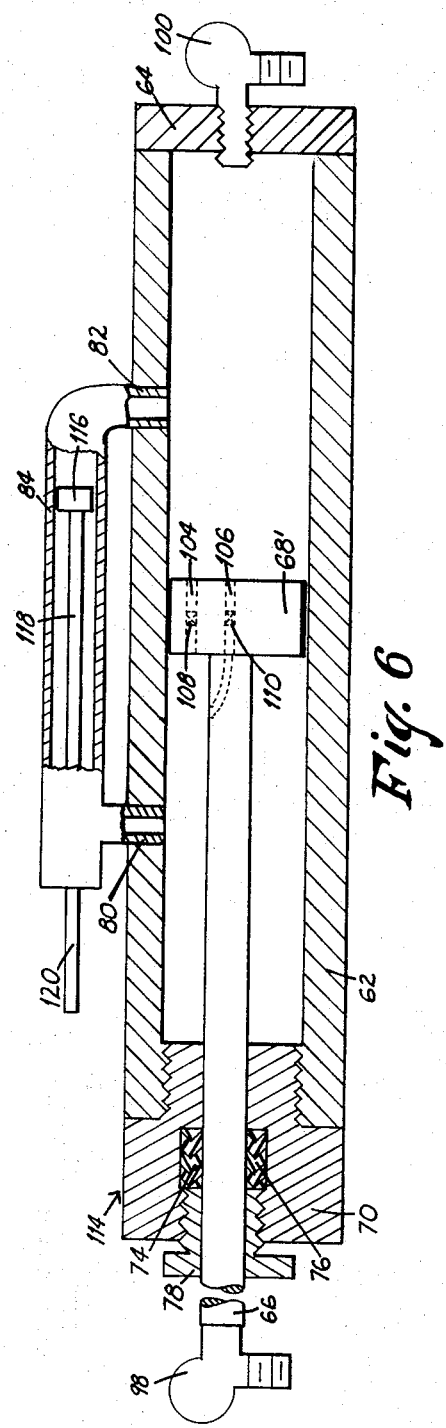

3,765,702

SWAY BAR FOR VEHICLES

BACKGROUND OF THE INVENTION

This invention relates to improvements in vehicle sway control devices and more particularly, but not by way of limitation, to a hydraulic control device for connection between a towing vehicle and a towed vehicle for reducing sway of towed vehicles during travel.

As a towed vehicle travels along a highway, side-ways forces acting on the towed vehicle, sudden gusts of wind created by the speed of travel, from other vehicles passing the vehicles either moving in the same or an opposite direction, or the like, frequently cause the towed vehicle to sway. This swaying produces difficulty in maintaining an efficient control of both the towing and towed vehicles, and in some instances the swaying may be sufficiently great as to actually turn the vehicles over. This has long been a problem in the towing of vehicles.

SUMMARY OF THE INVENTION

The present invention contemplates a novel hydraulic control device for connection between the towing vehicle and the towed vehicle for greatly reducing the sway and thus reducing the hazard of towing a vehicle along a highway, or the like. The device comprises a hydraulic cylinder having a piston head and rod slidably disposed therein and surrounded by a hydraulic fluid. The cylinder is secured to one vehicle and the piston rod is secured to the other vehicle whereby the piston is reciprocated within the cylinder upon relative swaying movement between the vehicles. The piston head is particularly designed for retarded movement within the cylinder, thus retarding relative movement between the vehicles and reducing the swaying of the towed vehicle.

It is an important object of this invention to provide a novel control device connected between a towed vehicle and a towing vehicle for reducing swaying of a towed vehicle.

It is another object of this invention to provide a hydraulic control device having one portion thereof connected with a towing vehicle and another portion thereof connected with the towed vehicle for reducing sway in the towed vehicle.

Other and further objects and advantageous features of the present invention will hereinafter more fully appear in connection with a detailed description of the drawings in which:

BRIEF DESCRIPTION OF THE DRAWINGS

FIG. 3 is a sectional elevational view of a modified sway control device embodying the invention.

FIG. 4 is an end elevational view of a piston such as may be used in the invention.

FIG. 5 is an elevational view partly in section of another modified sway control device embodying the invention.

FIG. 6 is an elevational view partly in section of still another modified sway control device embodying the invention.

DESCRIPTION OF THE PREFERRED EMBODIMENTS

Figure 1:
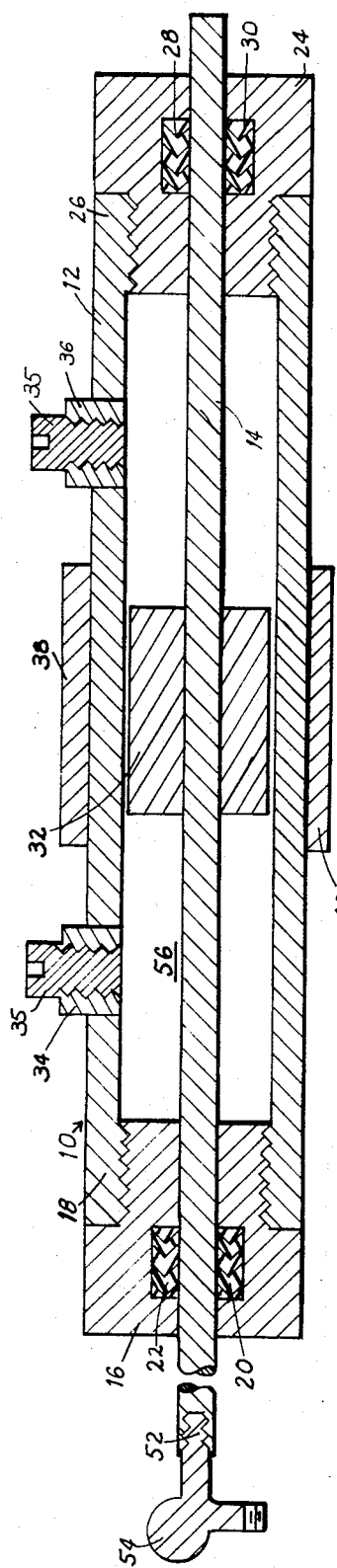
FIG. 1 is a sectional elevational view of a sway control device embodying the invention.
Figure 2:
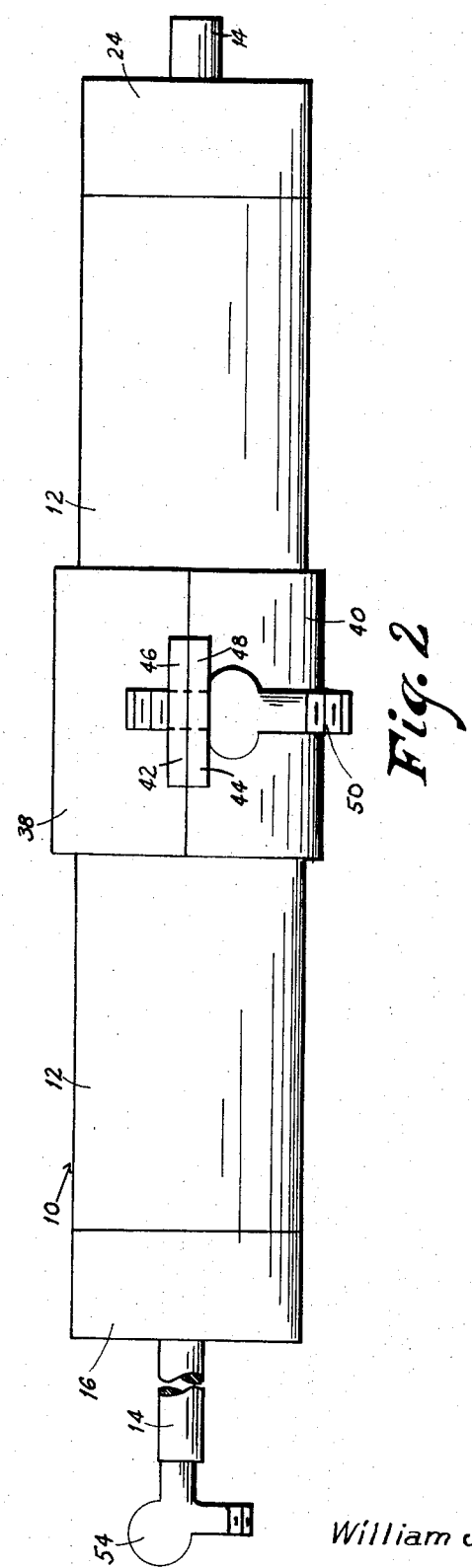
FIG. 2 is an elevational view taken on line 2—2 of FIG. 1.

Referring to the drawings in detail, and particularly FIGS. 1 and 2, reference character 10 generally indicates a sway control device comprising a sleeve or housing 12 having a rod member 14 centrally disposed therein and extending longitudinally therethrough. A suitable flanged packing gland 16 is disposed around the rod 14 and threadedly secured to one end of the sleeve 12 as shown at 18. An internal cavity 20 is provided on the inner periphery of the gland 18 adjacent the outer periphery of the rod 14 for receiving a plurality of suitable packing members 22 for precluding leakage of fluid around the rod 14. A similar packing gland 24 is disposed around the rod 14 and threadedly secured to the opposite end of the sleeve 12 as shown at 26. An internal cavity 28 is provided in the gland 24 adjacent the outer periphery of the rod 14 for receiving a plurality of suitable packing members 30 therein for precluding leakage of fluid around the rod 14. It will be apparent that suitable sealing members (not shown) may be provided between the sleeve 12 and the packing glands 16 and 20 for precluding leakage of fluid therebetween.

A piston head is secured to the rod 14 in any well known manner (not shown) and is slidably disposed within the sleeve 12 for reciprocal movement therein. It is preferable to provide a slight clearance between the outer periphery of the piston 32 and the inner periphery of the sleeve 12 for a purpose as will be hereinafter set forth. In addition, a first filler port 34 is provided in the sidewall of the sleeve 12 in the proximity of the packing gland 16 and a second filler port 36 is provided in the sidewall of the sleeve 12 spaced from the port 34 and disposed in the proximity of the packing gland 24 in order to facilitate the insertion of a suitable lubricant or fluid into the sleeve 12 between the packing glands 16 and 24 and around the rod 14 for a purpose as will be hereinafter set forth. Suitable plug members 35 are removably secured in the ports 34 and 36 for sealing the ports during operation of the device 10.

A pair of semi-cylindrical clamping members 38 and 40 are secured around the outer periphery of the sleeve 12 and are preferably substantially centrally disposed thereon. The adjacent ends of the semi-cylindrical members 38 and 40 are provided with complementary outwardly extending flanges 42 and 44, respectively, as shown in FIG. 2 having substantially aligned bores 46 and 48 provided therein for receiving a suitable coupling member, such as a tie rod member 50 therethrough. One end of the rod 14 is provided with a threaded bore 52 extending longitudinally therein for receiving a suitable coupling member, such as a tie rod member 54 therein. It will be apparent that a simple split sleeve may be welded or otherwise secured around the sleeve 12 in lieu of the half-sleeves 38 and 40 if desired. The tie rod members 50 and 54 may be independently connected with a towing vehicle (not shown) and a towed vehicle (not shown). For example, the tie rod member 50 may be secured in the usual manner to the towed vehicle, and the tie rod end 54 may be secured in the usual manner to the towing vehicle. It is to be noted that it is preferable that the connection with the towed vehicle be at the axle thereof, and the connection with the towing vehicle be directly over the axle thereof, and at as great an angle from the axle to the top of the frame of the towed vehicle as possible. However, there is not intention of limiting the connection between the vehicles to this particular arrangement. The tie rods 50 and 54 may be secured independently to the towing vehicle and the towed vehicle in any suitable manner, and to any portion of each vehicle as practical or desired.

When the device 10 is to be utilized for stabilizing or reducing the sway of a towed vehicle, such as a trailer being pulled by a car, or the like, the tie rods 50 and 54 may be independently secured to the car and trailer as hereinbefore set forth. One or both of the plugs 35 may be removed from the ports 34 and 36 for permitting the addition of a suitable fluid into the interior chamber 56 of the sleeve 12. It is usually preferable to add the oil through both ports 34 and 36 in order to assure an adequate filling of the chamber 56 on both sides of the piston head 32. There is no intention to limit the particular type of fluid to be used for filling the cavity 56, nor to particularly limit the clearance between the outer periphery of the piston 32 and the inner periphery of the sleeve 12. However, as a practical matter, a piston head having an outer diameter approximately 15,000 of an inch less than the inner diameter of the sleeve 12 in combination with a 30 weight oil has provided good results in the operation of the device 10. Of course, it will be readily apparent that the ease or speed of movement of the piston head 32 within the cavity 56 may be altered to achieve substantially any desired results by varying the clearance between the piston head and sleeve 12, and by varying the type of oil or fluid used in filling the cavity 56.

Assuming that the tie rod member 50 is secured to the trailer, and the tie rod 54 is secured to the car, any side forces acting on the trailer which may tend to cause the trailer to sway with respect to the normal vertical position thereof will transfer a "push or pull" longitudinal force to the sleeve 12, depending upon the direction of sway of the trailer. The sleeve 12 cannot move rapidly with respect to the rod 14 because of the retardation of the movement of the piston head 32 in the chamber 56, and thus the trailer is held against any rapid or sudden movement which deviates from the normal vertical position thereof. Thus, the swaying of the trailer is greatly reduced or substantially eliminated.

Referring now to FIGS. 3 and 4, a generally similar sway control apparatus 60 is shown. The control device 60 comprises an outer sleeve or housing 62 generally similar to the sleeve 12, and having one end thereof closed by an end closure member 64 which may be welded or otherwise secured thereon. A rod member 66 having a piston head 68 secured to one end thereof is slidably disposed within the sleeve 14 and a flanged packing gland 70 is disposed around the rod 66 and threadedly secured to the open end of the sleeve 62 as shown at 72. An annular recess 74 is provided in the gland 70 surrounding the outer periphery of the rod 66 for receiving a plurality of packing members 78 therein. A follower member 78 is threadedly secured in the recess 74 for adjusting the pressure on the packing members 76 for assuring an efficient sealing around the rod 66 and precluding leakage of fluid therearound.

A pair of ports 80 and 82 are provided in the sleeve 62 and spaced in the proximity of the opposite ends thereof. A by-pass line 84 is connected between the ports 80 and 82 in any well known or suitable manner to provide communication between the opposite ends of the internal chamber 86 of the sleeve 62 and facilitate movement of the fluid during reciprocation of the piston head 68, as is well known. A filler port 88 may be provided in the by-pass line 84 for facilitating inserting fluid into the chamber 86. In addition, it may be desirable to provide an air pocket in the by-pass line 84 between the ports 80 and 82, and the port 88 may be connected with an air supply source, if desired.

The piston head 68 may be of any suitable type and as shown herein is provided with at least one passageway or bore 90 extending longitudinally therethrough for facilitating reciprocation of the piston 68 within the chamber 86. It is preferable to provide a suitable pressure release valve 92 in the passageway 90 for opening in the event the pressure differentials acting thereon become excessive. In this manner, the piston head 68 will move more freely upon excessive forces acting thereon for precluding accidental breakage of the rod 66. The piston head 68 is also provided with a plurality of circumferentially spaced guide members 94 extending longitudinally therefrom in one direction and a plurality of similar circumferentially spaced guide members 96 extending longitudinally therefrom in the opposite direction. The guide members 94 and 96 are of a substantially circular outer configuration for facilitating the reciprocal movement of the piston 68 during operation of the device 60.

The outer end of the rod 66 is provided with a tie rod member 98 or other suitable connection or coupling members, and a similar tie rod or connection member 100 is secured to the end plate 64. Thus, the sway control apparatus 60 may be connected between a towing vehicle and a towed vehicle in much the same manner as the device 10. Of course, suitable fluid is admitted to the chamber 86 as hereinbefore set forth for retarding the travel of the piston 68 therein.

In operation, the device 60 functions in much the same manner as the sway control bar 10. As hereinbefiore set forth, one connector member may be secured to the frame of the towing vehicle, preferably directly above the axle of the vehicle, and the other connector member may be secured to the axle of the towed vehicle. Any forces acting on the towed vehicle which may tend to cause the vehicle to sway transmits a force to the device 60 tending to cause relative movement between the sleeve 62 and the rod 66. The travel of the piston 68 within the chamber 86 is restricted, thus slowing down or retarding any swaying movement of the towed vehicle. Of course, the fluid in the chamber 86 may move through the by-pass line 84 for transferring from one end of the chamber to the other. In the event the forces acting on the towed vehicle create an unusually great swaying reaction, and the forces acting on the apparatus 60 thus become excessive, the valve 92 will be open and permit the piston 68 to move more rapidly within the chamber 86, and substantially precluding any accidental breakage or other damage due to the apparatus 60 or either vehicle.

Referring now to FIG. 5, a sway control bar apparatus 102 is depicted which is substantially identical with the apparatus 60. However, the rod 66 is provided with a piston head 68' having a first passageway 104 extending longitudinally therethrough and a second passageway 106 extending through the head 68' and a portion of the rod 66. A suitable pressure release valve 108 is provided in the passageway 104 and a similar pressure release valve 110 is provided in the passageway 106. When the relative movement between the head 68' and the sleeve 62 is in one direction, the valve 108 will open in the event excessive pressures occur for permitting a more rapid movement of the piston in said direction. When the relative movement between the head 68' and the sleeve 62 is in an opposite direction, the valve 110 will open in the event of excessive pressures and permit a more rapid movement of the piston in this opposite direction. In addition, an air chamber 112 is suitably connected with the by-pass line 84 for assuring a supply of air in the by-pass line.

The operation of the sway bar control 102 is substantially identical with the operation of the device 60. However, the control of the movement of the piston 68' is somewhat different in that a pair of pressure release valves are provided in the piston head 68' for permitting a more rapid movement of the piston 68' in either direction under undue stress conditions.

Referring now to FIG. 6, a sway control apparatus 114 is disclosed which is generally similar to the devices 60 and 102. However, a free floating piston 116 and piston rod 118 is provided in the by-pass line 84. One end 120 of the rod 118 projects from the line 84 and a suitable packing member (not shown) is interposed between the rod 118 and the line 84 for precluding leakage of fluid therebetween, as is well known. The piston 116 and rod 118 freely reciprocate within the by-pass line 84 upon any reciprocal movement of the piston head 68'. The overall operation of the device 114 is generally similar to the devices 102, 60 and 10 as hereinbefore set forth.

From the foregoing it will be apparent that the present invention provides a novel hydraulic sway control bar adapted to be connected between a towing vehicle and a towed vehicle for stabilizing the towed vehicle against unwanted swaying thereof from sideways forces thereon. The novel device provides a piston surrounding by a fluid wherein the reciprocal movement of the piston is controlled or restricted for substantially eliminating rapid movement of the towed vehicle in a swaying motion with relation to the towing vehicle. The novel sway control bar is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A hydraulic sway bar control device for connection between a towing vehicle and a towed vehicle and comprising an outer housing, a piston rod reciprocally disposed within the housing, piston head means carried by the rod and reciprocally disposed within the housing, means for admitting a fluid into the housing sealing means precluding leakage of the fluid from the housing, said fluid cooperating with said housing and piston head for restricting the movement of the piston head within the housing, means connecting the housing with one of said vehicles and the piston rod with the other of said vehicles wherein relative swaying movement between the vehicles is restricted by the restricted movement of the piston, and wherein passageway means is provided in the piston head means, and pressure release valve means is provided in the passageway means responsive to excessive pressures in the housing for permitting more rapid movement of the piston therein.

2. A hydraulic sway bar control device as set forth in claim 1 wherein the passageway means includes at least two passageways providing communication between the opposite sides of the piston head means, and said pressure release valve means includes a pressure responsive valve disposed in each of said passageways for permitting a more rapid movement of the piston head in both directions under excessive pressure conditions within the housing.

* * * * *